Feb. 12, 1974　　L. S. EUBANKS ET AL　　3,791,935
PURIFICATION OF CARBOXYLIC ACIDS
Filed Nov. 10, 1971

United States Patent Office 3,791,935
Patented Feb. 12, 1974

3,791,935
PURIFICATION OF CARBOXYLIC ACIDS
Lloyd S. Eubanks and John T. Payne, Texas City, Tex., assignors to Monsanto Company, St. Louis, Mo.
Filed Nov. 10, 1971, Ser. No. 197,433
Int. Cl. C07c 51/42
U.S. Cl. 203—74          18 Claims

ABSTRACT OF THE DISCLOSURE

A process for the removal of halogen contaminants and the drying of aqueous monocarboxylic acids, particularly those produced by the reaction of an alcohol or olefin and carbon monoxide in the presence of the catalytic system comprising a Group VIII metal component and a halogen component containing bromine or iodine and at least a portion of the halogen component being either an alkyl halide and/or a hydrogen halide. The process comprises introducing a monocarboxylic acid stream containing water and the halogen contaminant into the upper half of a distillation column, removing an overhead fraction consisting primarily of the water and alkyl halide charged to said column, removing a stream from the middle portion of said column containing a major proportion of hydrogen halide present in said column, and removing a product acid stream from at or near the bottom of said column, the product acid stream being essentially dry and substantially free of the halogen contaminants charged to said column. The method is particularly applicable to the removal of water and iodine-containing compounds from acetic and propionic acids.

BACKGROUND OF THE INVENTION

The present invention relates to the purification of carboxylic acids. More particularly, the present invention relates to the purification of product streams of carboxylic acids produced by a catalytic system containing halogen components and which streams contain residual halogen components and water.

There have recently been proposed several processes for the production of carboxylic acids by the reaction of alcohols or olefins and carbon monoxide in the presence of catalytic systems containing (1) a Group VIII metal component such as a component containing ruthenium, rhodium, osmium, iridium, platinum, palladium, cobalt, nickel, etc. and (2) a halogen component, primarily a bromine or iodine containing component. Generally, the halogen component in the catalytic system is present as an alkyl halide such as methyl iodide or a hydrogen halide such as hydrogen iodide.

While the carboxylic acids produced by the above described processes are generally of relatively high purity as far as other organic by-products are concerned, they do contain water and relatively small amounts of halogen components as contaminants. In order that the carboxylic acids produced by such processes can be utilized in further reactions and other uses they must generally be freed from any water which is present as well as the small amounts of halogen contaminants present. When freed from such impurities the carboxylic acids thus produced are admirably suited for practically all uses in commerce and industry of such carboxylic acids and find a ready market therein.

SUMMARY

It is an object of the present invention to provide a process for purification of carboxylic acids.

A further object of the present invention is to provide a process for the removal of water as well as the removal of halogen containing impurities from streams of carboxylic acids.

A still further object of the present invention is to provide a process for removal of halogenated impurities from carboxylic acids, the carboxylic acids having been prepared by the reaction of an alcohol or olefin and carbon monoxide in the presence of a catalyst system comprised of a Group VIII metal-containing component and a halogen-containing component.

Another object of the present invention is to provide for recovery of the halogen components of such a halogen containing catalyst system for reuse in such system.

Another object of the present invention is to provide a process for the purification of acetic and propionic acids.

These and other objects of the present invention will become apparent from the drawing, description given herein, and the appended claims.

In the purification process of the present invention a stream of carboxylic acid containing from 2 to 10 carbon atoms and containing as contaminants water and certain halogenated materials is introduced into a distillation zone. By far the major proportion of the water present along with essentially all the alkyl halides present are removed as an overhead stream from this zone. This stream can be stored, disposed of or, preferably, recycled to the prior catalytic production process. A stream from the middle portion of this distillation zone is removed from said zone which stream contains the remaining proportion of the water present as well as essentially all of the hydrogen halide present in said distillation zone. This stream also may be stored, disposed of or, preferably, recycled to the prior catalytic production process. A product acid stream, essentially dry and substantially freed of the halogen components is removed at or near the bottom of the said distillation zone.

DESCRIPTION OF PREFERRED EMBODIMENTS

Figure 1:
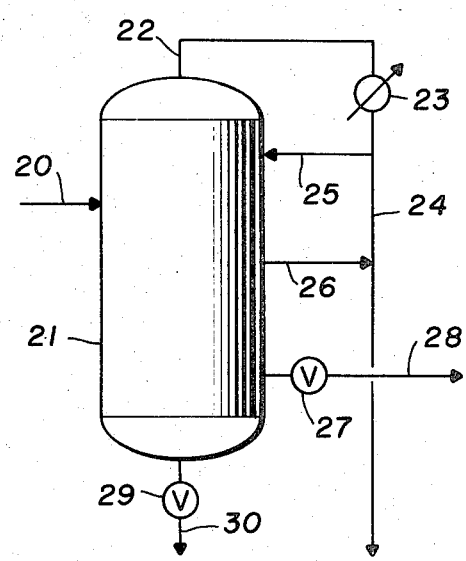
FIG. 1 is a schematic flow diagram of one embodiment of the purification process of the present invention.

The description of the manner of carrying out the purification process of the present invention follows with specific reference to the process flow diagram in FIG. 1. A stream of carboxylic acid to be purified, in either liquid or vapor form, is introduced via line 20 into column 21 in the upper half thereof. The carboxylic acid stream fed to the distillation column will comprise in addition to the carboxylic acid a substantial proportion of water and an alkyl halide such as methyl iodide and a relatively small portion of an ionizable halide such as hydrogen iodide. In some cases, there will also be present trace amounts of metallic halides. An overhead stream is removed via line 22 and condensed in condenser 23, the condensed stream passing via line 24 to either storage or recycle to the preceding catalytic process. Provision is made for recycle of a portion of the overhead via line 25 to serve as reflux in the column. This overhead stream comprises by far the major proportion of the water charged to the column as well as essentially all of the alkyl halide contained in the feed along with a very minor proportion of the hydrogen halide contained therein. Since recovery of the halogen values represents a distinct economic advantage of the process the overhead stream carried by line 24 is preferably recycled to the prior catalytic production process.

It has been found that, contrary to the alkyl halide component which is quite volatile under all normal column operating conditions, the hydrogen halide demonstrates an unexpected property which contributes to the efficient operation of the present purification process. The hydrogen halide is quite soluble in carboxylic acid-water mixtures containing at least a small amount of water, generally from about three to eight percent, and in the case of acetic acid four percent or more of water, while it is increasingly less soluble, or more volatile, in carboxylic acid-water mixtures containing lower quantities of water. In a distillation column operated so as to take overhead all or most of the water charged thereto as vapor then very little hydrogen halide will be present in the overhead vapor stream, but will tend to pass down the upper portion of the column in solution in the liquid carboxylic acid-water mixture. Likewise, in the lower portion of such column where very little water is in the form of liquid the hydrogen halide will be volatile rather than soluble in the dry acid liquid and will tend to move up such lower portion. Therefore, it has been found that a peak concentration of hydrogen halides occurs in the middle portion of such a column where the liquid composition of carboxylic acid-water ranges between about three and eight percent water. If a side stream is withdrawn from the middle portion of such column at or near the peak of hydrogen halide concentration then essentially all the hydrogen halide present in such column will be removed therefrom.

In the present process a stream is withdrawn from the middle portion of distillation column 21 via line 26 at or near the peak concentration of hydrogen halide in carboxylic acid-water mixture. This side stream withdrawn via line 26 is monitored and controlled as to its temperature thus determining the percentage of water in the side stream composition. This control serves to insure that the side stream is taken from near the peak of concentration of hydrogen halide in column 21. The temperature of the side stream is monitored and controlled by increasing or decreasing the heat added in the reboiler portion of the column as a result of such measurement. The side stream withdrawn via line 26 is directed to line 24 and treated in like manner as the overhead from column 21, i.e. either directed to waste, stored, or preferably, returned to the prior production process.

As a result of treatment and distillation in column 21 a purified carboxylic acid bottoms collects therein from which the desired product carboxylic acid stream is withdrawn. There are two alternative points of withdrawal of the monocarboxylic acid bottom stream illustrated in FIG. 1. When there are little or no metal halides present then it is most suitable and preferred to withdraw the carboxylic acid product stream directly from the bottoms of column 21 via valve 29 and a line 30 since such product stream will represent the carboxylic acid product having the lowest water and hydrogen halide content. If, however, there is present any significant quantity of metallic halides then such metallic compounds will collect in the bottom of the column 21 reboiler portion and in order to recover a carboxylic acid product stream free from such metallic impurities it will be found to be preferable to remove such stream from the bottom portion of column 21 in the form of a vapor just above the liquid level maintained in the reboiler. This side stream is preferably removed at just above the lowest plate in the distillation column via valve 27 and line 28 of FIG. 1. In this preferred mode of withdrawal of the product acid stream any metal halides which have collected in the sump in the reboiler of column 21 can be withdrawn via valve 29 and line 30 at intervals and that acid stream containing metallic halides can be either directed to waste, stored or preferably returned to the prior production process. When employing either alternative source of the product acid stream via line 28 or line 30 this product acid stream is found to be essentially dry carboxylic acid and substantially free of both alkyl halides and hydrogen halides present as halogen components in the original crude acid stream charged to the system via line 20.

Figure 2:
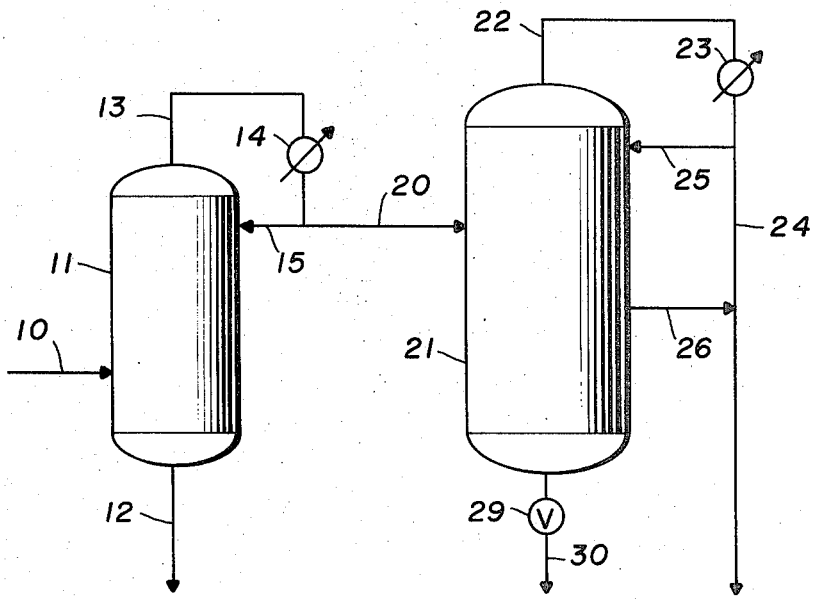
FIG. 2 is a schematic flow diagram of another embodiment of the purification process of the present invention.

In FIG. 2 there is illustrated another embodiment of the present invention. This alternative system will find utility when the crude monocarboxylic acid stream charged to the system contains some metallic halides from the reaction process producing such stream. This alternative employs a column of relatively few plates with little fractionating capacity but well adapted to eliminate both the metallic halides and much of the hydrogen halide present in such crude stream for immediate return to the prior production process. As illustrated in FIG. 2 the crude carboxylic acid stream to be purified, in either liquid, vapor or mixed liquid and vapor form, is introduced via line 10 into column 11 intermediate the ends thereof. The bottom stream of condensed acid still containing a small percentage of water, all of the metallic halides charged with the crude carboxylic acid stream and substantially all of the hydrogen halide charged to column 11 is withdrawn via line 12 from the bottom of column 11 and directly returned to the prior production process. In this manner essentially all metallic halides which may be present are returned directly to the previous process and are not found to collect in the subsequent purification system. The overhead from column 11 amounting to from 85 to 99 percent of the total feed to this first column is withdrawn via line 13 and condensed in the condenser 14. Thereafter the stream is divided with a portion thereof returned as reflux to column 11 via line 15 and a major proportion of the overhead serving as the feed stream via line 20 to distillation column 21. The operation of distillation column 21 is essentially the same as described in connection with FIG. 1 above with only one difference. In the system illustrated in FIG. 2 essentially no metallic halides will reach distillation column 21 and therefore the dry carboxylic acid bottoms collected in column 21 will be free of metallic halide contaminants and essentially free of any alkyl halide or hydrogen halide contaminants as well. Therefore the product carboxylic acid stream can be removed directly from the bottoms of column 21 via valve 29 and line 30.

It will be apparent from the description that there is virtually no waste from the present purification process since all the streams withdrawn are adaptable to be recycled to the reaction process producing the acid mixture which is purified. Thus the present process is extremely economical in the recovery of all active halogen catalyst components as well as unreacted initial reactants, such as carbon monoxide, for subsequent reuse in the catalytic production of additional carboxylic acid.

The carboxylic acids which may be purified by the process of the present invention comprise monocarboxylic acids containing water and at least one halogen contaminant as an impurity. The present process is most useful with carboxylic acids of two to ten carbon atoms irrespective of the process for production of such carboxylic acids. Most specifically the process is particularly applicable to the purification of acetic and propionic acids. Although the purification process of the present invention is adapted for use in purifying monocarboxylic acid streams from any source of manufacture, it is most preferred that the monocarboxylic acid stream be one produced by the reaction of an alcohol or olefin and carbon monoxide in the presence of a catalyst system containing a Group VIII noble metal component and halogen component, usually bromie or iodine. Included among the Group VIII noble metals are iridium, rhodium, platinum, palladium, cobalt, nickel, osmium, ruthenium, etc. At least a part of the halogen component is usually present in the form of an alkyl halide and/or a hydrogen halide. The process of the present invention is particularly applicable to the purification of acetic and propionic acids containing halogenated impurities and more particularly to the acetic and propionic acid streams which contain iodine contaminants such as alkyl iodide or hydrogen iodide. Such acetic and propionic acid streams are produced by the reaction of respectively, methanol and carbon monoxide or ethanol or ethylene and carbon monoxide in the presence of a catalyst system containing iridium, rhodium, platinum, palladium, osmium, or ruthenium, and alkyl iodide and/or hydrogen iodide.

In the present purification process briefly described above and illustrated in FIG. 1 the distillation zone can comprise any distillation column normally used for separation and purification and can be of either the packed or plate type or can be a combination packed-plate type. Generally, the distillation column will comprise a plate type column having from 20 to 100 trays and preferably from 30 to 80 trays. Although bubble cap trays and ballast trays may be employed in the column comprising the distillation zone, it is preferred that sieve trays be used.

In the embodiment of the present purification process described and illustrated in FIG. 2 the first or pre-distillation zone can again comprise any distillation column normally employed for separation of fluids and it can also be of the packed or plate type or combination of packed-plate type. Generally, the first or pre-distillation zone as represented by column 11 in FIG. 2 will comprise a plate type column having from 2 to 25, and preferably from about 5 to 20 trays and in the preferred embodiment employs sieve trays although other trays such as bubble cap and ballast may be employed.

The associated condensers employed with one or both the distillation columns described are of generally conventional design and manufacture. As will be recognized, various pumps, compressors, reboilers, seperation vessels, etc. normally employed in carrying out chemical processes can be employed in the process described herein. Since these do not form part of the invention, the detals of their use in various phases of the process description have not been included.

The temperatures and pressures employed in the distillation zone or zones of the present invention described above will vary considerably depending upon the particular carboxylic acid stream being purified. As a practical matter the distillation zone or zones are most often operated at pressures from approximately atmospheric to 100 p.s.i.g., although sub-atmospheric pressures may be employed if desired as well as super-atmospheric pressures well in excess of 100 p.s.i.g. Temperatures within the zones will normally lie between approximately the boiling point of water and at or slightly above the boiling point of the particular carboxylic acid being purified at the pressure of the zone.

When employing the process of the present invention to purify acetic or propionic acids, the distillation zone or zones are usually operated at pressures within the range of 0 to 60 p.s.i.g., preferably at pressures within the range of 0 to 45 p.s.i.g. At these pressures, the bottoms temperature of the zone or zones generally will be within the range of from approximately the boiling of the acid-water mixtures at the pressure employed to as high as 165° C. or higher, but preferably maintained below about 150° C. The temperature at the top of the distillation zone or zones likewise can range from as low as 100° C. up to the boiling point of the acid being purified at the pressure employed. When employing two distillation zones as illustrated in FIG. 2 the temperatures and pressures of the two distillation zones may be the same or different so long as both are within the ranges set forth above.

When employing the alternative embodiment of the present invention illustrated in FIG. 2 the point of introduction of the feed stream to the first or pre-distillation zone can vary anywhere intermediate the ends of the zone, but the feed stream usually is introduced into the lower half of that column. The entire overhead stream from that column with the exception of that portion recycled to supply reflux to the column is charged as feed to the second major distillation zone.

The feed stream to the second distillation column or to the sole column in the embodiment illustrated in FIG. 1 can be introduced anywhere in the upper half of that zone. Generally, this feed is introduced at a point above two-thirds of the height of that distillation zone or into the upper one-third thereof. The side stream taken from the second distillation zone or the sole zone in the case of the embodiment shown in FIG. 1 for recycle to the prior production process is taken from a plate in the middle portion of the second distillation zone so selected at the temperature and pressure of operation as to be at or near the peak concentration of hydrogen halide, since the purpose of this recycle stream is to remove all the remaining hydrogen halides present in that distillation zone. The product stream removed from the distillation zone of the embodiment illustrated in FIG. 1 can be removed at any point in the lower one-third and preferably from the lower one-tenth of this zone. As discussed above, the most desirable point for withdrawal of the product stream from this distillation zone is just above or below the lowest plate in the column. In the case of the second distillation zone of the system illustrated in FIG. 2 the most desirable point for withdrawal of the product stream is realized by taking a bottoms stream from the second distillation zone.

The purified product acid stream thus recovered is suitable for most uses both commercial and others of the various monocarboxylic acids purified by the present described process. This is particularly true with reference to the preferred acetic and propionic acids so purified. However, if it is desired that the carboxylic acid products be virtually completely free of any halogen contaminants because of very severe requirements of certain uses as highly purified reactants in catalytic systems in which the catalyst is most sensitive to the presence of even those trace amounts of halogen impurities which may remain in the acid products purified by the present process, then these acid products can be submitted to further, even more strenuous purification by additional treatments and processes. Such additional treatments or processes form no part of the present invention and require no discussion herein.

To demonstrate the effectiveness and to illustrate the application of the process of the present invention, the following non-limiting examples are set forth.

EXAMPLE I

A stream of acetic acid, water, hydrogen iodide and methyl iodide which had been flashed overhead after production by a noble metal and iodide catalyzed reaction of methanol and carbon monoxide was dried and purified of halogen components in a distillation column recovery system as illustrated by FIG. 1 of the drawing. This acetic acid/water feed stream was fed at the 25th plate of a 40-plate distillation column and purified in a continuous process wherein a side stream was withdrawn from the 19th plate of such column and returned to the flash distillation step and a purified product stream was withdrawn from the bottoms of the distillation column. These streams and the feed stream were analyzed over a 72 hour period at approximately 24 hour hour intervals and the results of such analyses are set out in Table below.

TABLE I

| Period | Feed | | Side draw | | | Bottoms product | | | |
| --- | --- | --- | --- | --- | --- | --- | --- | --- | --- |
| | $H_2O$, weight percent | HI, p.p.m. | $H_2O$, weight percent | HI, p.p.m. | Temp., °C. | $H_2O$, p.p.m. | HI, p.p.m. | MeI, p.p.m. | Temp., °C |
| 24 hours | 19.16 | 104 | 2.76 | 1,510 | 118 | 87 | 0.30 | 0.033 | 121 |
| 48 hours | 17.86 | 120 | 2.92 | 1,300 | 118 | 83 | 0.20 | 0.016 | 121 |
| 72 hours | 17.97 | 104 | 3.71 | 1,810 | 118 | 132 | 0.083 | 0.041 | 121 |

It is apparent from the above data that substantially all the hydrogen iodide present in the feed to this column was concentrated and removed in the side draw stream. It is also apparent that the bottoms product stream recovered was essentially dry acetic acid substantially freed of both hydrogen iodide and methyl iodide present in the initial feed stream.

EXAMPLE II

A purification system such as illustrated in FIG. 2 was operated continuously on a feed stream composed of acetic acid, water and halogen components as produced by the same catalytic reaction as in Example I. In this example the feed to the first or pre-distillation column was split into a bottoms stream in which most of the hydrogen iodide present was returned to the catalytic production process while the overhead, except for the reflux to the first column was fed to the second distillation column. A side-draw stream was removed from the second column and recycled along with the overhead therefrom to the production process while the dried and purified acid product was removed as a bottoms stream. Each of the above streams was analyzed at various intervals and the analyses are set out below.

TABLE II

|  | First column | | | | | | | |
|---|---|---|---|---|---|---|---|---|
|  | Feed | | | Bottoms | | Overhead | | |
| Period | $H_2O$, weight percent | HI, p.p.m. | MeI, weight percent | $H_2O$, weight percent | HI, p.p.m. | $H_2O$, weight percent | HI, p.p.m. | MeI, weight percent |
| 24 hours | 19.1 | 228 | 21.1 | 5.3 | 5,000 | 17.7 | 19 | |
| 48 hours | 17.9 | 248 | 24.5 | 7.2 | 3,000 | 20.3 | 57 | 21.2 |
| After 7 days | 15.9 | 365 | 21.1 | 3.9 | 4,100 | 17.9 | 24 | 21.9 |
| After 18 days | 20.1 | 190 | 26.5 | 11.3 | 2,300 | 24.1 | 14 | 16.4 |

|  | Second column | | | | | | |
|---|---|---|---|---|---|---|---|
|  | Feed | | Side draw | | | Bottoms product | |
|  | $H_2O$, weight percent | HI, p.p.m. | $H_2O$, weight percent | HI, p.p.m. | Temp., °C. | $H_2O$, p.p.m. | HI, p.p.m. | Temp., °C. |
| 24 hours | 17.7 | 19 | 6.2 | 27 | 117 | 270 | 8 | 119 |
| 48 hours | 20.3 | 57 | 7.7 | 76 | 117 | 200 | 12 | 119 |
| After 7 days | 17.9 | 24 | 8.7 | 250 | 117 | 170 | 9 | 121 |
| After 18 days | 24.1 | 14 | 9.6 | 134 | 118 | 800 | 5 | 121 |

EXAMPLE III

A purification system such as illustrated in FIG. 2 was operated in continuous manner with a similar feed stream composed of acetic acid, water and halogen components produced in the same manner as in the above examples. The purification system was operated in substantially the same manner as Example II. In this example the feed stream to the second distillation column, which comprised the overhead stream from a first column except for that portion serving as reflux, the side draw stream withdrawn from the 19th plate of such second column and a purified product stream withdrawn from the bottoms of the second column were analyzed for water and iodide content. The results of a five day continuous run sampled at 24 hour intervals are set out in Table III below.

TABLE III

|  | Second column | | | | | | |
|---|---|---|---|---|---|---|---|
|  | Feed | | Side draw | | Bottom product | | |
|  | $H_2O$, weight percent | HI, p.p.m. | $H_2O$, weight percent | HI, p.p.m. | HI, p.p.m. | MeI, p.p.m. | $H_2O$, p.p.m. |
| 24 hours | 19.5 | <50 | 4.65 | 548 | 0.027 | 0.024 | <200 |
| 48 hours | 20.5 | <50 | 4.64 | 371 | 0.008 | 0.037 | <200 |
| 72 hours | 22.8 | <50 | 11.33 | 151 | 0.024 | 0.046 | <200 |
| 96 hours | 14.8 | <50 | 5.36 | 1,250 | 0.600 | 0.036 | <200 |
| 120 hours | 14.3 | <50 | 9.60 | 295 | 0.046 | 0.043 | <200 |

It is apparent from the above data that the bottoms product stream recovered was essentially dry and substantially free of both hydrogen iodide and methyl iodide.

We claim:
1. A process for the purification of monocarboxylic acid streams containing water and halogen contaminants including an alkyl halide and a hydrogen halide, which process comprises
   (a) introducing an acetic or propionic acid stream containing water and said halogen contaminants into the upper half of a distillation zone,
   (b) removing an overhead fraction containing a major proportion of the water and alkyl halide charged to said zone,
   (c) removing a stream from the middle portion of said zone below the point of introduction in (a) and at or near the peak concentration of hydrogen halide present in said zone, and
   (d) removing a product monocarboxylic acid stream from the lower part of said zone,
   (e) the said product acid stream being substantially dry and substantially free of the halogen contaminants charged to said zone.
2. The process of claim 1 wherein said halogen contaminants are iodides.
3. The process of claim 1 wherein said halogen contaminants are bromides.
4. The process of claim 1 wherein said monocarboxylic acid stream comprises acetic acid, said halogen contaminants comprise iodides and said acid stream is introduced into the upper third of said distillation zone.
5. The process of claim 1 wherein the monocarboxylic acid stream comprises acetic or propionic acid produced by the reaction of an alcohol or olefin and carbon monoxide in the presence of a catalyst system of a Group VIII noble metal component and a halogen component.
6. The process of claim 1 wherein the monocarboxylic acid stream comprises acetic acid produced by the reaction of methanol and carbon monoxide in the presence of a catalyst system of a Group VIII noble metal component and an iodide.
7. The process of claim 1 wherein said distillation zone comprises a distillation column having from 20 to 100 trays.

8. The process of claim 1 wherein said monocarboxylic acid stream is pre-distilled by
(a-1) introducing said acetic or propionic acid stream into a pre-distillation zone,
(a-2) removing a stream from the bottom portion of said pre-distillation zone containing a major proportion of the hydrogen halide charged to said pre-distillation zone,
(a-3) removing an overhead stream containing a major proportion of the acid, water and alkyl halide charged to such pre-distillation zone, and
(a-4) introducing a major proportion of said overhead stream from such pre-distillation zone into the upper half of the said distillation zone.

9. The process of claim 8 wherein said pre-distillation zone comprises a distillation column having from 2 to 25 trays.

10. The process of claim 8 wherein the monocarboxylic acid stream comprises acetic acid, said halogen contaminants comprise iodides and said overhead stream from said predistillation zone is introduced into the upper third of said second distillation zone.

11. The process of claim 8 wherein said overhead from said pre-distillation zone comprises from 85 to 99 percent of the total feed to said pre-distillation zone.

12. The process of claim 1 wherein said distillation zone is maintained at a pressure of from atmospheric to 100 p.s.i.g. and at a temperature of from 100° to 165° C.

13. The process of claim 8 wherein said pre-distillation zone and said distillation zone are maintained at pressures of from atmospheric to 100 p.s.i.g. and at temperatures of from 100° to 165° C.

14. The process of claim 1 wherein overhead fraction (b) and stream (e) are returned to the process for producing said monocarboxylic acid stream.

15. The process of claim 8 wherein bottoms stream (a-2) overhead fraction (b) and stream (c) are returned to the process for producing said monocarboxylic acid stream.

16. The process of claim 1 wherein the product monocarboxylic acid stream is removed in vapor form from above the liquid level in the bottom of said distillation zone.

17. The process of claim 16 wherein said product monocarboxylic acid stream is removed from just above the lowest plate in said distillation zone.

18. The process of claim 8 wherein said product monocarboxylic acid stream is removed from the bottoms of said distillation zone.

References Cited
UNITED STATES PATENTS

| | | | |
|---|---|---|---|
| 3,490,997 | 1/1970 | Burney et al. | 260—541 |
| 3,084,109 | 4/1963 | Ure et al. | 260—541 |
| 3,438,870 | 4/1969 | Roscher et al. | 203—99 |
| 3,692,636 | 9/1972 | Huguet | 203—99 |
| 2,412,215 | 12/1946 | Guinot | 260—541 |
| 2,384,374 | 9/1945 | Harrison | 203—81 |

WILBUR L. BASCOMB, JR., Primary Examiner

U.S. Cl. X.R.

203—15, 16, 81, 99; 260—540, 541